(No Model.) 2 Sheets—Sheet 1.
G. G. SCHROEDER.
MOP HOLDER AND WRINGER.
No. 588,534. Patented Aug. 17, 1897.
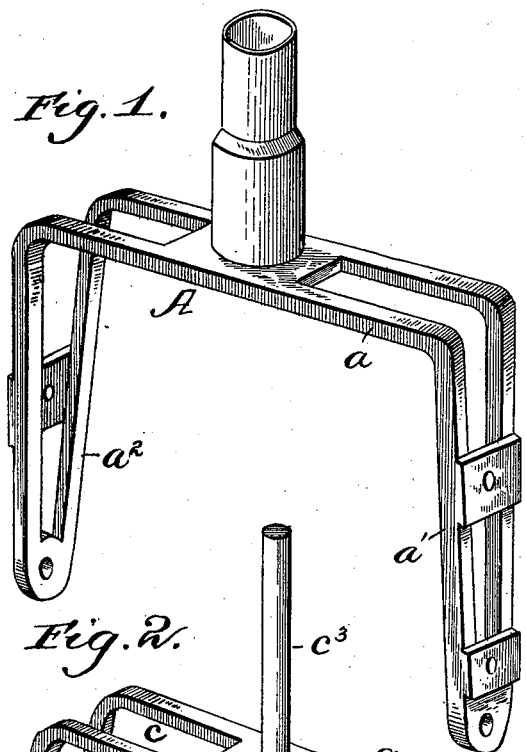
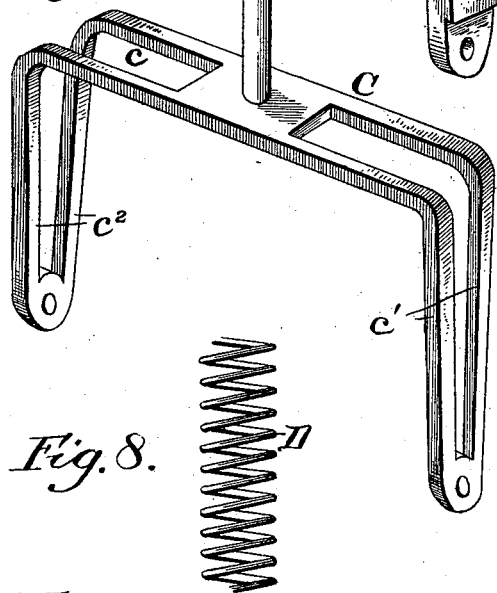
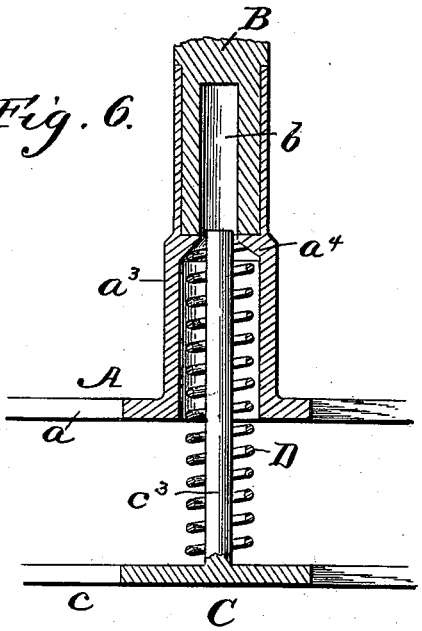
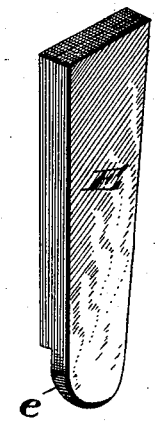
Witnesses:
J. B. McGirr.
Ralph C. Hilton.
Inventor:
George G. Schroeder (No Model.) 2 Sheets—Sheet 2.
G. G. SCHROEDER.
MOP HOLDER AND WRINGER.
No. 588,534. Patented Aug. 17, 1897.
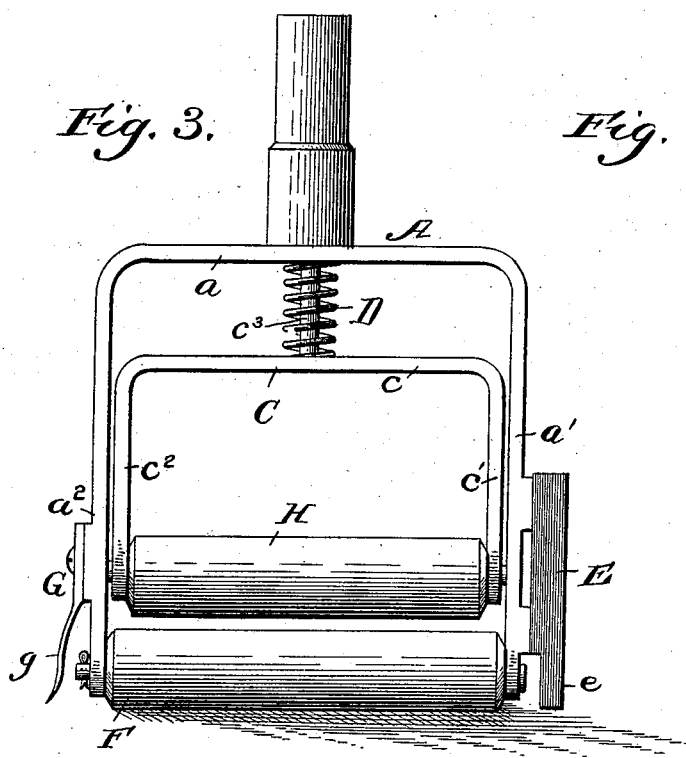
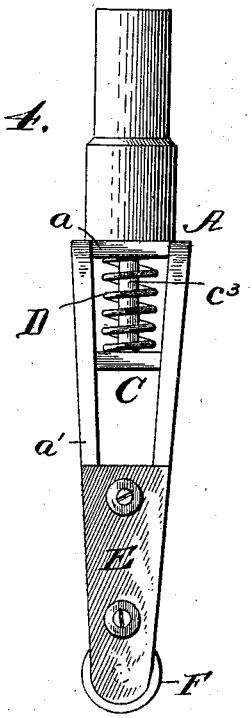
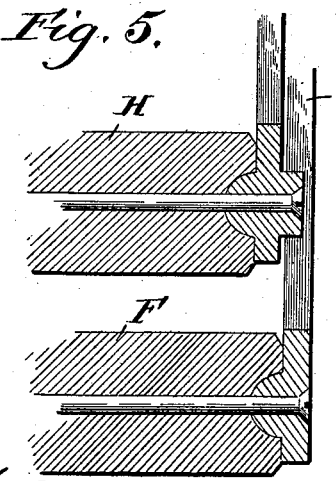
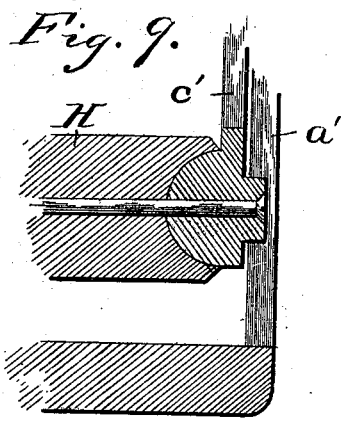

UNITED STATES PATENT OFFICE.

GEORGE G. SCHROEDER, OF WASHINGTON, DISTRICT OF COLUMBIA.

MOP HOLDER AND WRINGER.

SPECIFICATION forming part of Letters Patent No. 588,534, dated August 17, 1897.

Application filed March 5, 1896. Serial No. 581,922. (No model.)

*To all whom it may concern:*

Be it known that I, GEORGE G. SCHROEDER, a citizen of the United States, residing at Washington, in the District of Columbia, have invented certain new and useful Improvements in Mop Holders and Wringers; and I do declare the following to be a full, clear, and exact description of the invention, such as will enable others skilled in the art to which it appertains to make and use the same, reference being had to the accompanying drawings, and to the letters of reference marked thereon, which form a part of this specification.

The invention relates to improvements in mop-holders, referring to combined mop-holders, wringers, scrubbers, and scrapers, and has reference more particularly to the class in which the cloth can be readily and quickly wrung out by drawing it between the rollers; and it consists, mainly, in the combination, with a suitably-constructed handle and frames, of a rubber and a scraper attached at suitable points to the outer frame, preferably to the outer side and depending arms thereof, the scraper and the rubber being preferably attached to opposite arms of the said outer frame. If desired, the lower roller may be replaced by a rigid bar of any suitable cross-section, but preferably having said section rectangular, as shown in Figure 9.

The invention further consists in certain details of construction and arrangement of parts hereinafter more fully described, and pointed out in the appended claims.

In the drawings accompanying and forming part of this specification, Fig. 1 represents a perspective view of the outer frame of a mop-holder embodying the invention. Fig. 2 represents a similar view of the inner frame thereof. Fig. 3 represents a side view of the head without the handle attached. Fig. 4 represents an edge view thereof. Fig. 5 represents a detail sectional view of parts of the frames and attached rollers at one end of the head. Fig. 6 represents a detail sectional view of adjacent parts of the frames and the spring between said frames. Fig. 7 represents a perspective view of the block-shaped rubber detached from the outer frame. Fig. 8 represents a side view of the coiled spring that acts between the inner and outer frames.

Fig. 9 represents a detail view of a modification in which the lower roller is replaced by a rigid bar integral with the outer frame of the mop-holder, which bar may be of any desired cross-section, but in practice would preferably be rectangular.

Referring to the drawings by letter, A designates the outer frame of the mop-holder, having the transverse central portion $a$ and the depending legs $a'$ $a^2$, respectively. For convenience and lightness the said frame is preferably made with openings, except at its ends, where the bearings for the rollers are situated, and at its center, where the socket $a^3$ rises, the said socket being made integral therewith, as shown in Figs. 1 and 6, and having its upper portion chambered to receive the meeting portion of the mop-handle, the lower end of which abuts against a perforated diaphragm or shoulder $a^4$ at a proper point in said socket.

B designates the handle, which is reduced in size at its lower end to enter and fit snugly in the chambered portion of the socket, and is provided therewithin with an axial chamber $b$, for a purpose hereinafter explained.

C designates the inner frame of the mop-holder, provided with the central portion $c$ and depending legs $c'$ $c^2$, respectively. The frame C is cut away or made with openings, except at its ends, which are provided with bearings for the upper roller, and at its center, from which rises the stem $c^3$, of suitable length and diameter to pass up into the chamber $b$. The said frames are preferably made of metal rods, the bearing-blocks and the central socket and rod-plates being secured in position by suitable solder or otherwise.

D, Figs. 3, 4, 6, and 8, is a coiled spring surrounding the stem $c^3$ between the inner frame C and the shoulder $a^4$ in the socket $a^3$.

E is a cleaning or polishing block of vulcanized rubber or equivalent material secured to the end of the leg $a'$ of the frame A by screws or otherwise, conforming in shape to said end and cut away sufficiently at its lower end $e$ to give clearance to the adjacent journal of the lower roller F, the connections of which are hereinafter more fully described.

G is a scraper secured to the outer side of the lower end of the leg of the outer frame A, opposite that bearing the rubbing-block. The said scraper has a body secured by screws or otherwise to a suitable point of the said leg, near the lower end thereof, and a spring-plate $g$, free at its lower end, which stands out a sufficient distance from the adjacent leg $a^2$ of the frame A and is not sufficiently long to extend to the lower side of the lower roller F, so that its point will be clear when the frame is not inclined sidewise. To use the said scraper, the frame is turned edgewise in suitable position and given the proper motion by the handle B.

H is the upper roller, having its ends journaled in bearings at the lower end of the legs of the inner frame C in suitable bearing-blocks secured thereto. These bearing-blocks, as shown in Fig. 5, are solid and have hemispherical bosses fitted into similar recesses in the adjacent ends of the rollers, which turn on axial rods passing through them. The blocks are secured to the lower ends of the corresponding frames, and the axial rods are held in place by heads at one end and pins at the other, as seen in Figs. 3 and 5, or by other suitable means. The said bosses are made with large diameters and fit into similar recesses in the adjacent ends of the corresponding rollers, and the said ends are preferably beveled inward from their meeting-points with the bosses, so that clearance is thereby given and the mop-cloth is not liable to catch and bind between the rollers and bearings.

I am aware that mop-holders having an inner and an outer frame have been used, and such I do not desire to claim, broadly; but

What I claim as new, and desire to secure by Letters Patent, is—

1. In a mop holder and wringer, the combination with the inner and outer frames, and the upper and lower rollers, constructed and arranged substantially as described, of the axial rods upon which said rollers turn and the bearing-blocks in which said rods are journaled; said blocks having plate portions for attachment to the corresponding frames and hemispherical bosses that fit into corresponding recesses in the adjacent ends of the rollers and give large bearing-surfaces thereto, substantially as specified.

2. A mop-holder comprising the outer U-shaped frame having the top central tube or socket and vertical guides in its leg portions, a mop-holder jaw or member secured to the lower ends of the frame, a U-shaped frame entirely within the outer frame, a stem rigid therewith and in said socket, a spring pressing the inner frame down, the lower ends of the inner frame having projections movable in said guides, and rounded bearings, a clamping-roller having end depressions receiving said bearings, all substantially as and for the purposes set forth.

In testimony whereof I affix my signature in presence of two witnesses.

GEORGE G. SCHROEDER.

Witnesses:
R. C. WILTON,
J. Z. YODER.